US008689345B1

(12) United States Patent
Martin et al.

(10) Patent No.: US 8,689,345 B1
(45) Date of Patent: *Apr. 1, 2014

(54) MITIGATING FORGERY OF ELECTRONIC SUBMISSIONS

(75) Inventors: Eric J. Martin, Bainbridge Island, WA (US); Jesper M. Johansson, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,058

(22) Filed: Oct. 20, 2011

Related U.S. Application Data (63) Continuation of application No. 12/239,424, filed on Sep. 26, 2008, now Pat. No. 8,051,465.

(51) Int. Cl.
*G06F 7/04* (2006.01)

(52) U.S. Cl.
USPC .......................................................... 726/26

(58) Field of Classification Search
None
See application file for complete search history.

(56) References Cited

U.S. PATENT DOCUMENTS

| | | | |
|---|---|---|---|
| 5,708,780 A | 1/1998 | Levergood et al. | |
| 6,266,773 B1 | 7/2001 | Kisor et al. | |
| 7,743,153 B2 | 6/2010 | Hall et al. | |
| 8,505,106 B1 | 8/2013 | Bhosle et al. | |
| 2003/0004874 A1 | 1/2003 | Ludwig et al. | |
| 2003/0208562 A1 | 11/2003 | Hauck et al. | |
| 2008/0115201 A1* | 5/2008 | Sturms et al. | 726/9 |
| 2009/0271847 A1 | 10/2009 | Karjala et al. | |
| 2010/0251143 A1 | 9/2010 | Thomas et al. | |
| 2012/0030732 A1 | 2/2012 | Shaty | |
| 2012/0159177 A1 | 6/2012 | Bajaj et al. | |

OTHER PUBLICATIONS

U.S. Appl. No. 12/575,393, filed Oct. 7, 2009, Titled: Mitigating Forgery for Active Content.
U.S. Appl. No. 13/931,613, filed Jun. 28, 2013, Titled: Cross-site request Forgery Mitigation in Multi-Domain Integrations.

* cited by examiner

*Primary Examiner* — Brandon Hoffman
(74) *Attorney, Agent, or Firm* — Kilpatrick, Townsend & Stockton, LLP (57) ABSTRACT

Cross Site Request Forgery (CSRF) and other types of fraudulent submission in an electronic environment can be mitigated using state information that typically is already maintained for various users. Each submission requiring authentication includes a state identifier (ID). The state ID is compared to corresponding a state ID submitted in a relatively secure format, such as in a secure token or cookie. If the state ID matches a state ID in the secure token received from the user, and the state ID is valid, the submission is processed. Otherwise an interstitial page, including the state ID and a secure token, is generated to prompt the user to confirm the submission. A subsequent confirmation submission will contain the proper state ID and the new cookie, and can be processed. If no confirmation is received from the user with a valid state ID, the submission is not processed.

25 Claims, 5 Drawing Sheets

MITIGATING FORGERY OF ELECTRONIC SUBMISSIONS

CROSS-REFERENCE TO RELATED APPLICATIONS

The present application is a continuation application of U.S. Pat. No. 8,051,465, filed Sep. 26, 2008, entitled "MITIGATING FORGERY OF ELECTRONIC SUBMISSIONS."

BACKGROUND

As the number of users viewing information and purchasing items electronically increases, there is also an increasing amount of forgery, misuse of identity information, and other illicit activities in such an electronic environment. Forced unauthorized commands or submissions from a trusted user of a Web site, for example, is often referred to as Cross Site Request Forgery (CSRF or XSRF). Typically, the submission is made to originate at the Internet protocol (IP) address of the user, such that the actual initiator of the submission is untraceable. The attacks often affect Web sites that use mechanisms such as state management, Web cookies, browser authentication, or client-side certificates to authenticate users. A CSRF exploit can be, for example, executed by tricking or otherwise causing a user into submitting malicious form data to a trusted Web site. The exploit typically originates at a malicious site, as a malicious payload in a file such as a hypertext markup language (HTML) or JavaScript file, or is delivered as a file attachment via an email message, which can contain script code triggering an action to be performed on a third-party site on behalf of the victim.

In one example, a user might browse product pages of an electronic marketplace, which can result in information being stored on a client device of the user. In an Internet-based environment, this can include storing information about the user in a cookie for a browser on the client device. Any person or process (such as a malicious Web site) gaining access to this cookie can use this information to submit requests, such as purchase requests, change of delivery address requests, or even funds transfer requests, to the electronic marketplace that will look as if the requests were initiated by the user for whom the cookie was stored. Even without the attacker being able to directly read the cookie, the attacker can cause the cookie to be used to take unauthorized actions on the site that placed the cookie, on behalf of the user. For example, an attacker can cause the user to purchase an item or execute a bank transfer, without the user's knowledge, by causing a form requesting this action to be submitted by the user.

In another example of a fraudulent submission, a person or process might intercept information passing between a user and a remote location. In an example where a user does banking electronically, a user might submit a form to pay a bill through a banking institution. A person or process intercepting that form submission, and able to interpret or extract the information contained therein, can cause a similar form request to be sent that can initiate a transaction such as a transfer of money from the initial user's account, where the request looks as if it came from the user. In still other examples, a person or process might simply try to use random session or user identifiers to attempt to forge a request for an action through an electronic application or process.

One conventional approach to mitigate CSRF attacks is to use the referrer header of a client request to determine whether the request is from the expected sender. However, while simple in complexity, the client application controls this aspect, and thus is subject to spoofing by exploiting a client application. In addition, some clients may omit the referrer header entirely in some circumstances. Therefore, this approach can't be relied upon with a great deal of confidence.

Another conventional approach to attempt to prevent processing of an unauthorized submission by a person or process posing as a trusted user is to generate a random number and digitally sign that number with a cryptographic key. The encrypted number is then sent to the user as form data, for example, with the encrypted number being embedded in the form and returned with each form submission in order to verify that the request is coming from an authenticated user browsing the site hosting the form. The number must be decrypted, and compared to the number that was issued, then a determination is made as to whether the number was issued recently. Such an approach comes with a significant amount of cryptographic processing overhead that is burdensome for many providers of electronic content, especially those of large scale and transaction volume.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to mitigating fraudulent or deceptive activity in an electronic environment. Systems and methods in accordance with various embodiments provide approaches for validating the source of a submission received in an electronic environment utilizing information that is, in many cases, already available for trusted users. For example, session or state information is often maintained when a user accesses an application, page, site, or process across a network. In an Internet-based example, a user might have a session identifier ("ID") or other state identifier or state information generated by the accessed server when the user logs in to, or otherwise accesses or is authenticated to, a Web site, Web page, application, online game, etc. A session ID in one embodiment is a pseudo-random number, alphanumeric identifier, etc., which is used as an index into a data store that contains session and/or state information for a user. The session ID generally is used to identify a user and associate that user with previous actions, provide a personalized experience, make purchase recommendations, etc.

In many cases, the session ID will be stored locally on a client device of the user, such as in a "cookie" (e.g., web cookie, HTTP cookie, etc.) or other such token for a browser, application, or interface on the client device. Generally, a "cookie" refers to a piece of text generated by a server and sent to a client application on a client device, which is stored locally on the client device and can be sent with any subsequent request from the client device back to that server, address, or other related location or device. Cookies can be used to store information such as user identification information, authentication information, session information, and user-specific information, such as personalization information, preference information, etc.

When a user logs in or is otherwise authenticated to a site, application, etc., in an electronic environment, a server such as a Web server can generate a session ID that is sent to the client device and stored in a cookie. The Web server can also store the session ID and other state or session information locally to the Web server, or on the "server side". In one example, all active session IDs are stored to a state table or data store on the server side. In this way, the session information can be determined for any request that is received by the Web server, such that the Web server or any other device or process on the server side can access related information for the user. The security of a user's session in such an embodiment is directly reliant on the security of the cookie, such as a session tracking cookie, or other token storing the session ID on the client device. If that token is compromised, security of the user's session is also compromised. Therefore, it is reasonable to base security decisions on such a token.

Systems and methods in accordance with various embodiments take advantage of the fact that state information can be stored at both the client and server sides to validate the source of any received submissions, and thus mitigate or otherwise reduce the number of fraudulent submissions that are received purporting to be submitted on behalf of an unknowing user. For example, a user visiting a malicious site can expose information that allows a fraudulent request to be submitted to a Web site on behalf of the user. If the request does not include the proper state information, however, a Web server or other such device or process can determine that there is something wrong with the request and can prompt the user for confirmation using an interstitial page or other such process discussed herein.

While examples will be discussed generally with respect to Internet-based technologies, such as Web sites, client browsers, cookies, etc., it should be understood that advantages of the various embodiments can be obtained for any appropriate electronic environment wherein requests, messages, or other packets of electronic information are submitted from one address or location to another address or location, and it is possible for a person, device, or process to send such a packet of information in a way that makes it appear as if the packet came from a different source, user, etc.

Figure 1:
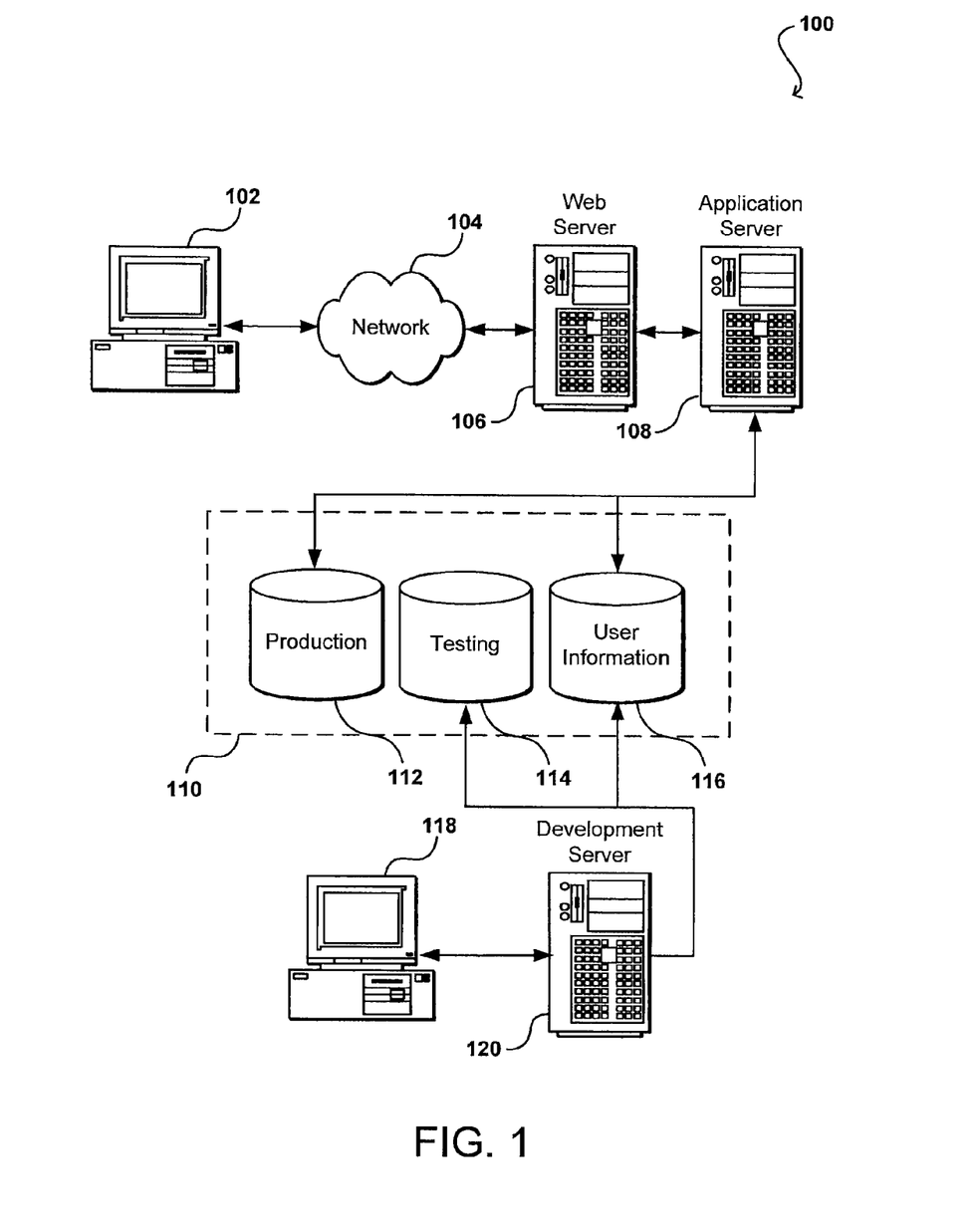
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically rims code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple associates or other content providers might wish to offer users the opportunity to not only buy directly from the marketplace, but also to purchase items via an associate's site. As discussed above, however, a provider such as an electronic marketplace typically will want some control over actions performed on behalf of a trusted user or customer. The electronic environment in such a case might include additional components and/or other arrangements, such as those illustrated in the configuration 200 of FIG. 2. In this example, devices such as a user client device 202 and a third party device 204 are able to access an entity 208 across a network 206. The "entity" as it will be referred to herein can include any appropriate combination of devices, processes, and components for receiving requests across the network and serving responses in response thereto. The entity might provide a Web site or electronic marketplace, for example, or could in some embodiments include an enterprise application, a company's electronic presence, a database application, etc., as discussed elsewhere herein. Further, while the present embodiment is discussed with respect to an electronic marketplace, it should be apparent to one of ordinary skill in the art in light of the teachings and suggestions contained herein that advantages and aspects of the various embodiments can be used with any of a variety of other such entities, sites, providers, etc., such as may include online banking sites, electronic or online gaming, content providers, electronic auction sites, and similar endeavors.

Figure 2:
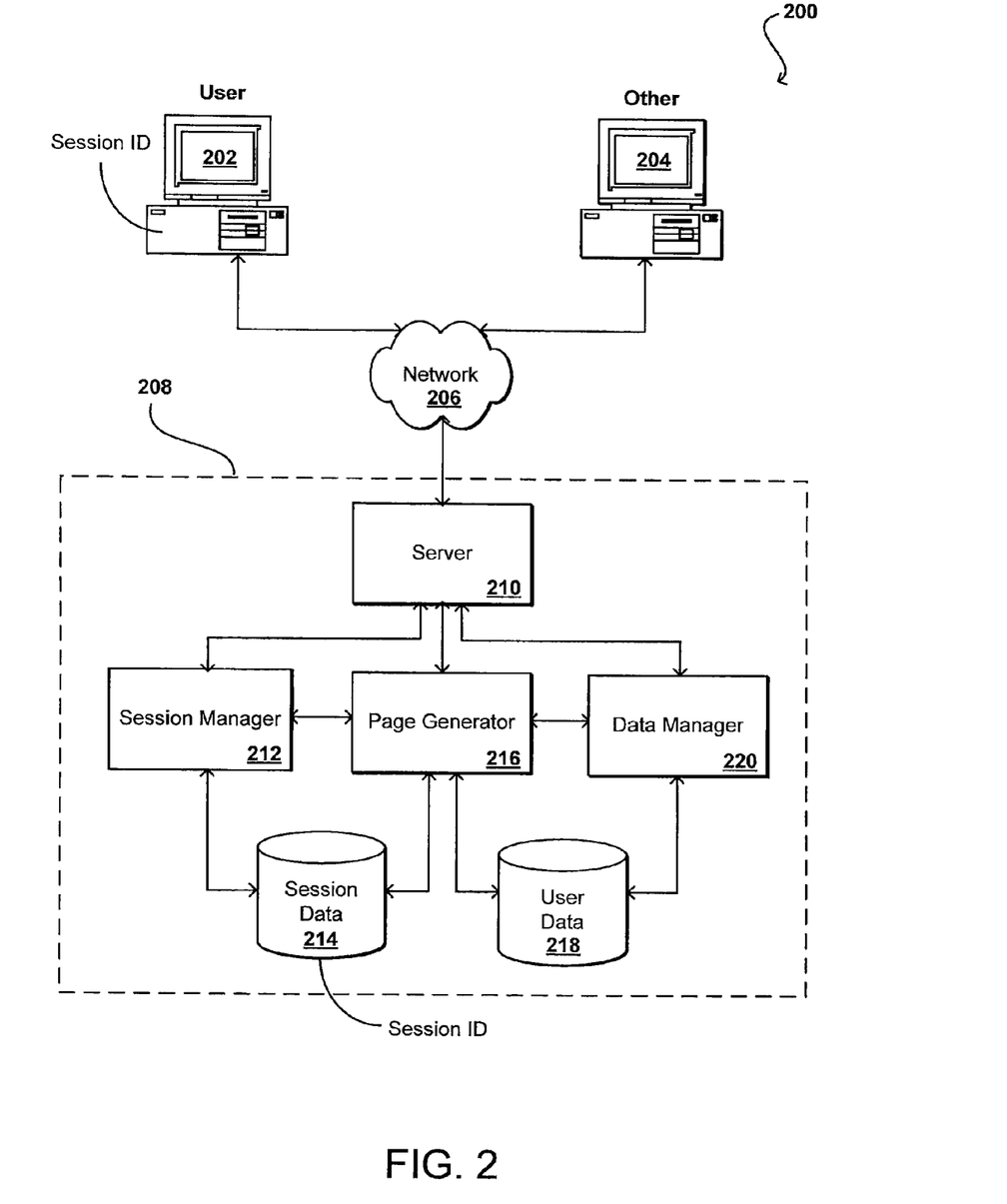
FIG. 2 illustrates components for analyzing form submissions that can be used in accordance with one embodiment.

In this example, the entity 208 includes at least one server 210, such as a Web server or application server, able to receive requests from across the network 206. While described with respect to a network such as the Internet, it should be appreciated that this also could be an intranet or local network, for example. The server in this example communicates with a page generator 216 that is able to access information in any appropriate data store, such as a user data store 218 or session data store 214, and generate page information to be sent to a client device for display. The entity can include a data manager 220 that is able to manage data such as user data, item data, production data, etc., and store that data to at least one data store such as the user data store 218. The entity in this example also includes a session manager 212 able to manage session information for any user, process, request, etc., and store that session information to the session data store 214. While these components are shown as separate components, it should be understood that components such as the session manger, page generator, and data manager can be separate or common applications or processes running on a single device or multiple devices, and that information such as the user data and session data can be stored in separate data stores, as separate tables in a single data store, across a distributed data system, etc. Such an entity typically will include additional components and processes known in the art for such environments, and can include any of a number of variations within the scope of the various embodiments.

Figure 3:
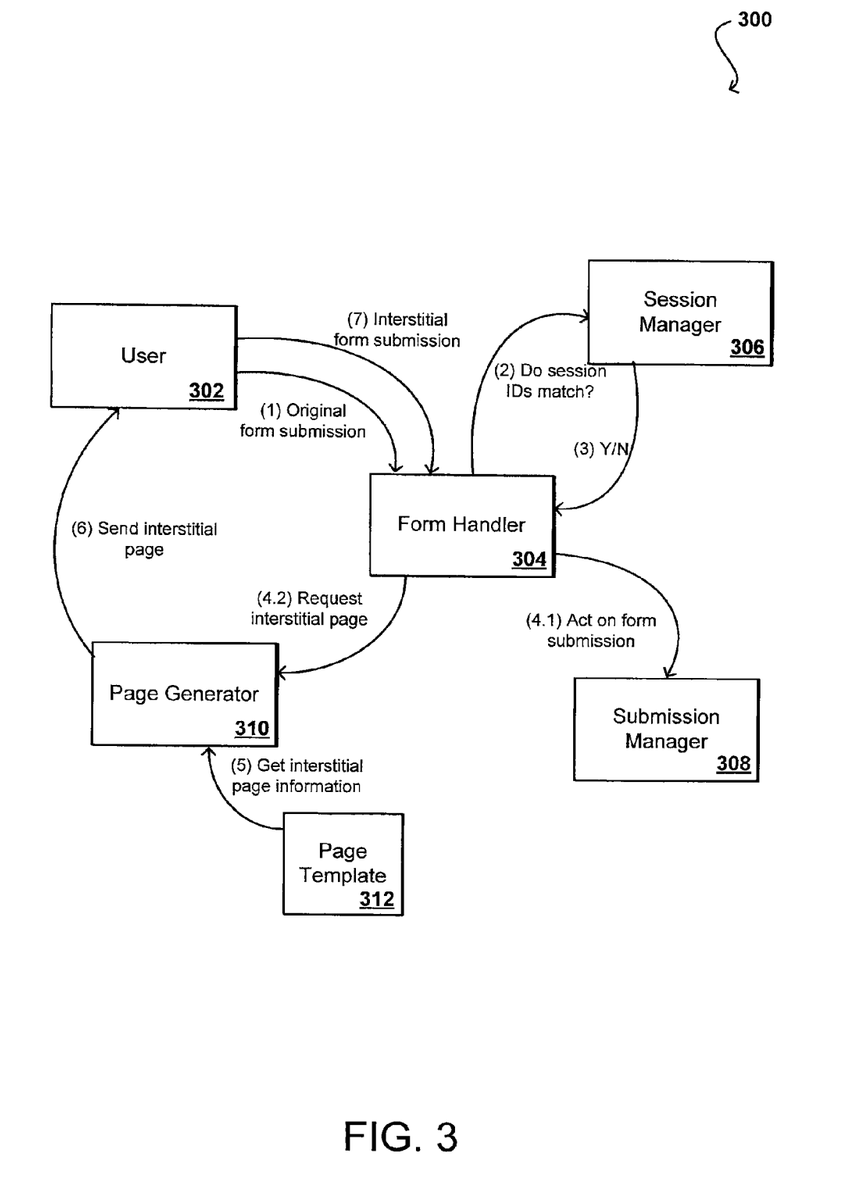
FIG. 3 illustrates a state diagram for a process that can be used in accordance with one embodiment.

FIG. 3 illustrates a state diagram 300 showing various states of operation of an example entity such as that described with respect to FIG. 2. This example assumes that a user or user device 302 has accessed a page of information that has been provided at some point in the past by the page generator 310 or a similar component or process. In many cases, a token will have been transmitted to the user or otherwise caused to be generated on the user device. If the user is authenticated to the system, a secure token can be transmitted to the user and stored in a secure fashion in a cookie or other such location, as known in the art. The user at some point causes a request or other packet of information to be submitted by performing an action, such as clicking a "submit" button on the page. In this case, as shown at event (1), the request is sent as an original or initial form submission from the user. When this original form submission is received, the form can be directed to a component such as a form handler 304, which can be part of the Web server or another appropriate device or process. The form handler may handle its own processing or may pass the processing off to other components. In one embodiment, the form handler is solely responsible for implementing session ID validation to ensure that malicious requests are detected. The form handler receives raw, "un-trusted" user data and performs input validation on that data before further processing can take place. The form handler also can receive a copy of the secure token from the user, either as part of the submission or as a separate submission. The secure token can be transmitted as part of a cookie, as described in the various embodiments herein, or can be transmitted as part of a uniform resource locator (URL) or using any other appropriate mechanism known in the art. In some embodiments a token is submitted as part of every request.

The form handler 304 can examine the form submission to determine whether a session ID (or similar state identifier as discussed herein) was included in the submission, and whether that session ID matches the session ID received in the secure token. A submission in one embodiment contains all form data, represented as URL parameters in the case of a GET submission, or form header parameters in the case of a POST submission. If the user has an authentication cookie to the Web site then the cookie is contained in an HTTP/HTTPS header. All data in such a submission can be considered un-trusted and un-validated until validated.

If the submission includes a session ID in a form field, and corresponding session or state information also has been received in a token for the user, the form handler 304 at event (2) passes the session IDs and any other appropriate information to a session manager 306, which determines whether the session IDs match, as well as whether the matching IDs correspond to a stored session ID that is still active and valid. The session manager 306 at event (3) returns a response to the form handler 304 indicating whether the session IDs from the form submission and the token match, and whether those IDs correspond to an active session. ID stored for the user associated with the request. If the session IDs match and the session ID is active, then information for the request is passed on to a submission manager 308 or similar component in order to act on the submission, at event (4.1), such as to process the request, etc.

If the form submission does not include a session ID, the session ID included in the form submission does not match the session ID submitted in a cookie, or if the session ID in the cookie is not matched to a current session, then the form handler can pass information for the submission to a page generator 310 or similar component, at event (4.2), requesting that an "interstitial" page be generated and sent to the user. As referred to herein, an interstitial page refers to any page, display, message, or other set of electronic information sent to a user that requires some action by a user before a previous submission can be processed. In many embodiments this will involve sending page information to a browser of a user wherein the user must view the interstitial page and submit another form confirming that the user submitted the previous form in order to process the previous submission. In other embodiments, this can include sending an email message, text message, instant message, or other appropriate communication informing the user that another action is required to process the previous submission. For example, an email message might be sent to a user including a link that the user must follow to confirm the previous submission, or in some cases might simply instruct the user to reply to the message where the message is capable of including the session ID in a hidden form field of the message, etc. Extra care can be taken when generating the interstitial page to ensure that all form submission parameters are HTML encoded and validated, or otherwise neutralized, to prevent rogue data being sent back to the user in the interstitial page. Such an approach can help to mitigate cross-site scripting (XSS or CSS) vulnerabilities in the interstitial page.

When the page generator 310 receives the request for an interstitial page, the page generator at event (5) can access a page template 312, page shell, or other appropriate mechanism useful for generating the interstitial page. In some cases there might be several templates available that can be used, depending upon the type of submission that was received. In other cases, there might only be a single template available but a variety of text or other elements that can be used depending on the type of submission. Information from the submission also can be used with such a template in order to provide a sufficient amount of information for the user to confirm or deny the previous submission. For example, if the previous submission indicated that the user wished to purchase one-hundred televisions, the page generator can select an appropriate template for a purchase request, and can generate text to include in the page that asks whether the user intended to purchase one-hundred televisions. Also, the user's session ID is stored in a hidden form field of the interstitial page to be submitted with the next submission, along with the information in the user's session cookie or other secure token. If the user did not have a valid session ID previously, a valid session ID is generated during construction of the interstitial page and returned both in the interstitial page and in the session cookie returned to the user together with the interstitial page. Any original form parameters, such as an original "FORM ACTION=" attribute, can be copied into the form on the interstitial page. The interstitial page can be a composite of standardized content, custom information about a specific action that is to be taken, and form data. In one embodiment, an ACTION or similar parameter for this page points to the original form handler. Any details particular to the specific form handler also can be retrieved for inclusion on the interstitial page. These details can be inserted in place holder locations on an interstitial page to ensure the user can identify any action that is about to be taken.

Once the information for the interstitial page is generated, the page information is sent to the address of the user or user device 302 at event (6) to be displayed or otherwise conveyed to the user. As discussed, in several embodiments the interstitial page will take the form of a page being displayed in a browser application on the user device. When the interstitial page is displayed to the user, the user can verify that the user intended for the previous submission to be performed or, alternatively, deny (e.g., refuse to resubmit) the previous submission. If the user indicates that the user did not initiate the previous submission, or that the submission is otherwise improper, the information for the previous request can be discarded and the user can be directed to an appropriate page, such as a home page of the site that attempted to verify the user identity, or any other appropriate location.

In a case where the original submission was initiated by a malicious script utilizing JavaScript or other hidden client side code, for example, it is unlikely that the user will ever receive and/or view the interstitial page. The interstitial page thus can be sent using a "fire and forget" type approach, whereby no information is stored for the interstitial page and any necessary information is instead kept with the interstitial page in hidden form fields. Unless the malicious code chooses to surface the interstitial page to the intended victim, that page will simply be lost and the initial submission discarded.

If the user instead selects an option to verify that the previous submission was proper and was initiated by, or on behalf of, the user, another form submission (an "interstitial form submission") can be generated and sent back to the system at event (7) to be processed by the form handler 304. The session ID stored on the user device is included in the interstitial form submission in a hidden form field. If there is no session ID information for the user, such as where the session ID expired before the user initiated the interstitial form submission, the form submission will fail again. If necessary, this may require the user to log back into the system or otherwise be authenticated. The form handler 304 then can receive the information for the interstitial form and can process that information as if the information was for an original form submission, such as by validating and matching session IDs and either passing the information to a submission manager at event (4.1) or requesting another interstitial page at event (4.2). In this example, each form submission will either result in the information being passed to a submission manager for action, or the issuance of an interstitial page. If no matching session ID is found, then the process will keep looping until the person attempting to make a fraudulent request finally gives up. In some embodiments, the process can stop if the interstitial page does not include a valid session ID. In other embodiments, a number of tries can be allowed before the process stops and the original request is denied.

Since such approaches can involve tracking additional state information for each user, such approaches may not be optimal in all situations.

Figure 4:
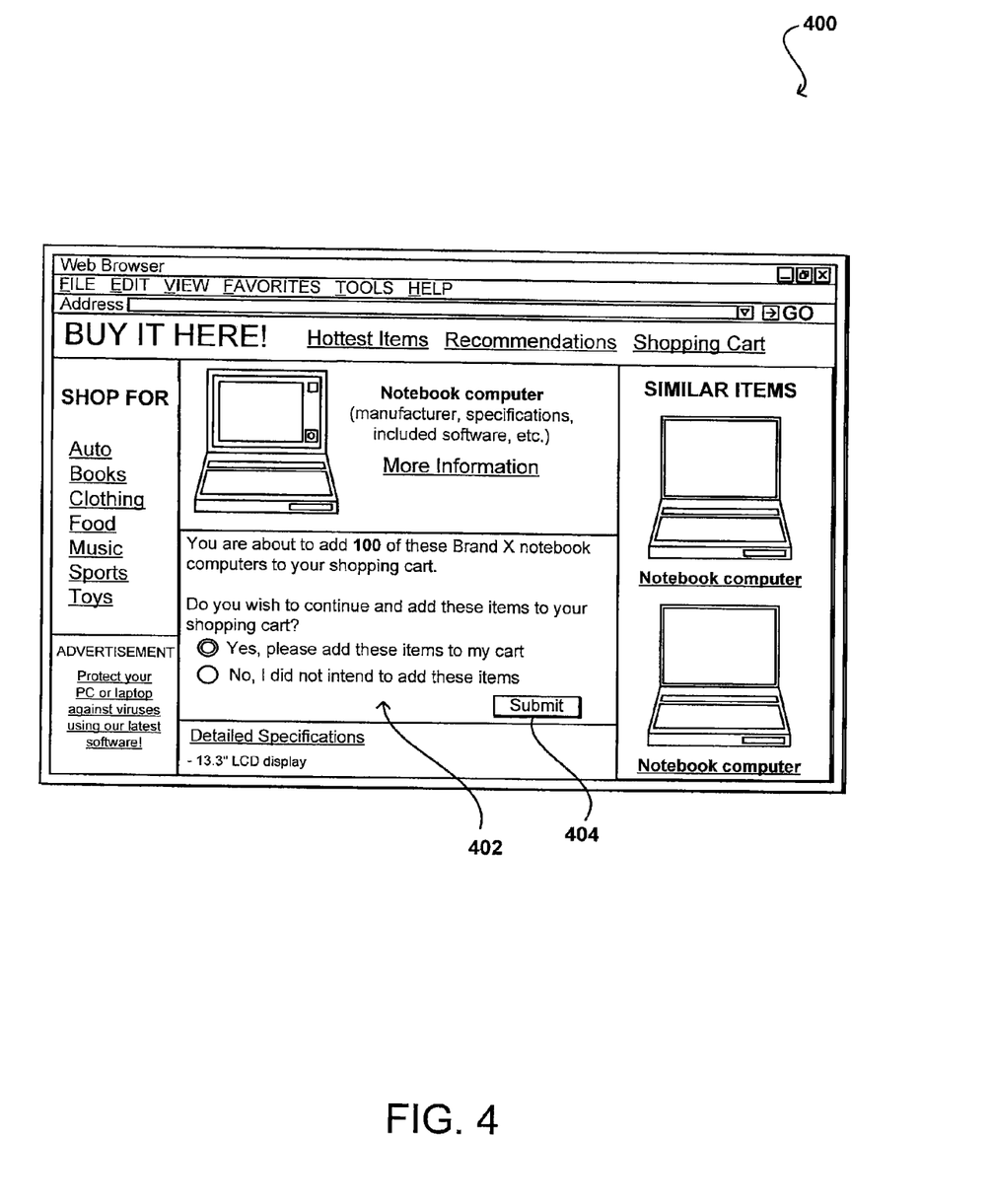
FIG. 4 illustrates an example of an interstitial page that can be displayed in accordance with one embodiment.

FIG. 4 illustrates an example of an interstitial page 400 that can be displayed to the user. In this example, a message is displayed to the user indicating that a request was received to purchase items on behalf of the user, in this case one-hundred notebook computers. The interstitial page can include any other appropriate information, such as information about the items allegedly being purchased, related items or information, etc. The interstitial page also includes at least one option or element 402 allowing the user to indicate whether the user initiated this request, and/or an element 404 used to submit the indication. This example includes radio buttons and a submit button, but many other or alternative elements can be used as would be apparent to one of ordinary skill in the art in light of the teachings and suggestions contained herein, such as a single confirmation button, yes/no buttons, separate hypertext links to confirm or deny, alert dialogs, etc. As discussed, the interstitial page can include information in hidden fields, such as a session ID and information from the previous request, which then can be included in hidden form fields in the interstitial form submission so that the request information can be processed if the session IDs now match. Also, storing the request information in hidden form fields allows the information to later be obtained through the interstitial form submission. For example, if the user in this example confirms that the user wants to order one-hundred notebook computers, the information about the one-hundred notebook computers is included in the interstitial form submission such that there is no need for the system to store the information about the notebook computers locally. This can be especially advantageous when the request was fraudulent, as an interstitial form submission might never be received, such as where the supposed user no longer uses that address or the original form submission was submitted programmatically and the interstitial page is hidden from the user, which would require the system to store that information for at least a given period of time. In this approach, the information can instead be recovered from an interstitial form submission if the request was a true request from that user.

Figure 5:
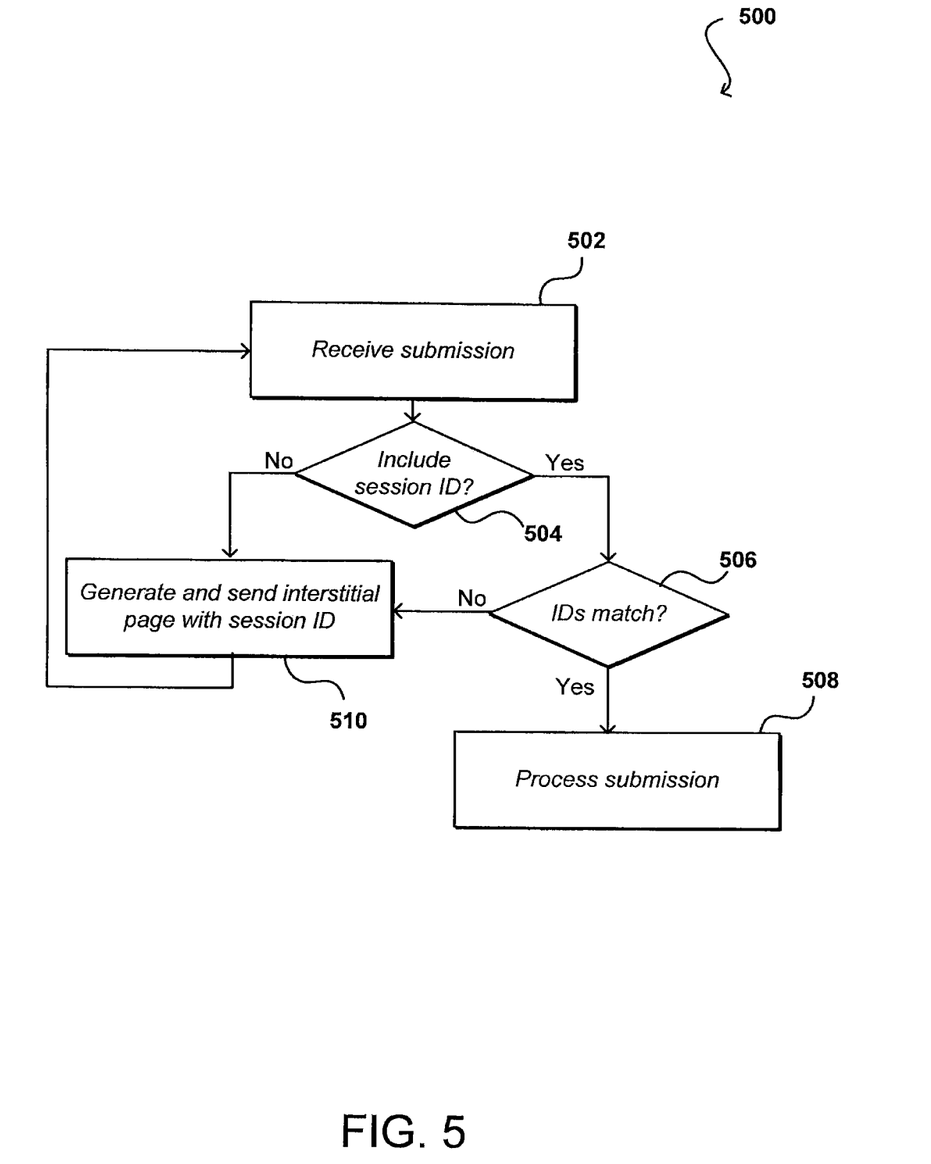
FIG. 5 illustrates a process for analyzing form submissions that can be used in accordance with one embodiment.

To provide a more general understanding, FIG. 5 illustrates steps of a process 500 for validating the source of a request using session information that can be used in accordance with various embodiments. In this example, an initial submission is received that includes information identifying the submission as being sent on behalf of a user 502. A determination is made as to whether the submission contains a session ID 504. As discussed, a session ID is merely an example, and any appropriate identifying information can be used as discussed elsewhere herein. If the submission includes a session ID, then a determination is made as to whether the included session ID matches a session ID received in a secure token for the user, and whether the session ID also corresponds to an active session ID stored by the system for that user 506. If the session ID of the submission matches the session ID of the cookie and is determined to be an active session ID for that user, the submission is processed 508. If the submission did not include a session ID, the included session ID did not match a session ID in a secure token received from the user, or the session ID is not valid and active, then an interstitial page is generated, and the interstitial page and a secure token are sent to the user to confirm (or deny) the previous submission 510. The process then can continue, with each subsequent submission being analyzed for a valid and matching session ID until a valid and matching session ID is included in one of the submissions. It also should be pointed out that if a user denies that the initial submission came from the user, the form submission including the denial will include the session ID information, and processing the submission can include deleting any information relating to the submission, or storing the information for purposes of investigating fraudulent activities, and then directing the user to an appropriate page.

The use of interstitial pages is desirable in some instances because a user might be allowed to make purchases from another site, application, or environment, as discussed above. For example, a user might be using an affiliate Web site or playing an online game that allows the user to generate submissions to a specific site. In a specific example, a user might be able to purchase an item from an electronic marketplace by selecting a hyperlink or other element on a third party site. Because the electronic marketplace might want to allow purchasing via a third party site to increase revenue, etc., it can be desirable to allow any requests that originate from outside of the electronic marketplace. In order to reduce the likelihood of fraud, however, the electronic marketplace might want to have the actual user verify the submission before processing. In such a case, when a submission is received on behalf of the user or from a third-party page, an interstitial page can be sent to the user to confirm the action. A link on the third party site would go directly to the electronic marketplace, such that the electronic marketplace controls (as much as is reasonably possible) the next page displayed to the user in response to that submission. Thus, instead of showing an order confirmation page or similar page in response to the submission, the user can view an interstitial page that requires the user to confirm the action before the submission is processed and the user receives the order confirmation page for display.

While the embodiments discussed above have related generally to tracking session information in cookies and hidden form fields for a Web site such as an electronic marketplace, it should be understood that various other embodiments can include, function with, and/or address other such functionality. For example, an entity can add state validation functionality for any page, site, submission, request, etc., where an authenticated identity of the user is of importance. Any such page viewed by a user can require that any state ID present in a token or elsewhere on the client device is submitted with a request or other submission. While this can take the form of a hidden field in some embodiments, other approaches can be used as well, such as appending the state information to a uniform resource locator (URL), placing the information in a header of the request, etc. When the submission is received, a determination can be made based on the type of submission, information included in the submission, etc., to determine whether to verify a state ID before processing that submission.

A system in accordance with one embodiment also can utilize multiple session IDs. A recognition session ID might be used to track non-critical information, such as user viewing preferences, general geographic information used to display relevant content, etc. A recognition session ID might not expire, at least for an extended period of time, and might not be stored in a secure cookie. An authentication session ID might be used to verify the identity of the user, and might be stored in a secure cookie or other secure location. In this case, the authentication ID would typically be used with the form handler and session manager to validate the source of a request, as the authentication session ID is handled securely and typically would only be valid for a relatively short period of time. Authentication session IDs can be required for processes such as purchasing items, transferring money, etc. Any submission sending an authentication session ID also can be required (e.g., by setting a cookie as secure) to be sent over a secure connection in at least some embodiments, such as a connection using a secure sockets layer (SSL) or similar secure communications protocol. Alternatively, the same session ID can be used for both authenticated and recognized scenarios, but marked on the server to indicate which the session ID represents.

Such use of already existing session information and interstitial pages can be advantageous in many instances because such a solution involves minimal modification to existing forms and form handlers. Forms in one embodiment are modified to contain the session ID in a hidden field, and the form handlers are modified to include session ID validation code. Pages that do not require protection can ignore such a mitigation process entirely and operate as normal. Such an approach does not require significant processing overhead such as processes that require cryptographic processing of form tokens for each protected page. Further, since only pages that are to be protected will be intercepted, the vast majority of form submissions are unaffected and any friction caused by an interstitial page can be minimized.

In one embodiment, a session object can be used to embed a session ID in a form, such as is demonstrated by the following pseudo code:

... write "<form action ... >"
write "<input type=\"hidden\" name=\"SessionID\" value=\" "
write Session→getSession( )
write "\" ... >"
...

The form handler can compare this value to the actual session ID in the cookie. This is shown in the following example pseudo code:

if(Session→getSession( )!=request.form.SessionID)
    //build and return interstitial page, including SessionID value end if
//process form Conceptually, such a fix is quite simple and adds only a small bit of additional processing.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP (including IPv4, IPv6 and all protocols of the general suite of protocols included in TCP/IP), OSI-appropriate protocols, UPnP, NFS, CIFS, SONET, SDH, ATM, Frame Relay, MPLS, and AppleTalk. The network can be, for example, a local area network, a wide-area network, a virtual private network, the Internet, an intranet, an extranet, a public switched telephone network, a satellite network, a cellular network (including GSM TDMA and CDMA), an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as ASP, ASPX, JSP, PHP, Perl, Python, or TCL, as well as combinations thereof. The server(s) may also include database servers, including without limitation those commercially available from Oracle®, Microsoft®, Sybase®, IBM®, and Sun®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
receiving a submission request corresponding to a source;
receiving a secure token associated with the source, the secure token including a secure state identifier;
determining, by a computing system, whether the submission request includes a session identifier;
in response to determining that the submission request includes a session identifier, determining whether the session identifier matches the secure state identifier and whether the session identifier and the secure state identifier correspond to an active session identifier;
in response to determining that the session identifier matches the secure state identifier and that the session identifier and the secure state identifier correspond to an active session identifier, causing the submission request to be processed; and
in response to at least one of determining that the submission request does not include the session identifier, determining that the session identifier does not match the secure state identifier, or determining that the session identifier and the secure state identifier do not correspond to an active session identifier, validating the source of the submission based at least in part on an electronic page provided for user input.

2. The method of claim 1, wherein validating the source of the submission comprises:
generating the electronic page such that the electronic page includes a set of information that allows the user at the source to confirm that the user caused the submission request to be submitted;
sending the electronic page to the source; and
causing the submission request to be processed when the user at the source confirms that the user caused the submission request to be submitted.

3. The method of claim 1, wherein the submission request is processed by a session manager and the session identifier is a first session identifier, the method further comprising:
sending the received submission request to a session manager when the session identifier is included in the submission request, wherein causing the submission request to be processed comprises:
receiving an interstitial form submission; and
verifying that a second session identifier is included in the interstitial form submission and that the second session identifier matches the first session identifier such that the session manager is enabled to process the submission request upon verifying that the second session identifier matches the first session identifier.

4. The method of claim 3, wherein contents of the second session identifier are same as contents of the first session identifier.

5. The method of claim 1, wherein the secure token is received as part of a uniform resource locator or as part of a cookie.

6. The method of claim 1, wherein the secure token is included in the submission request.

7. The method of claim 1, wherein the session identifier was received prior to receiving the submission request.

8. The method of claim 1, wherein the active session identifier expires after a predetermined period of inactivity.

9. A method comprising:
receiving a form submission corresponding to a source, the form submission including a session identifier generated in response to an authentication of the source;
receiving a secure token associated with the source, the secure token including a secure state identifier;
determining, by a computing system, whether the session identifier does not match the secure state identifier;
causing the form submission to be processed when the session identifier corresponds to the secure state identifier and an active state for the source; and
in response to determining that the session identifier does not match the secure state identifier, validating the source of the form submission based at least in part on an electronic page provided to the source of the form submission.

10. The method of claim 9, further comprising:
requesting a page generator to generate the electronic page such that the electronic page includes a set of information that allows a user at the source to confirm submission of the form submission;
sending the electronic page to the source; and
causing the submission request to be processed when the user at the source confirms submission of the form submission.

11. The method of claim 9, further comprising:
receiving an interstitial submission from the source of the form submission;
generating for display a subsequent electronic page when the received interstitial submission does not include an active state identifier that matches the secure state identifier; and
sending the subsequent electronic page and another secure token to the source for further confirmation.

12. The method of claim 9, further comprising:
generating the electronic page using a page template, state information, and information corresponding to the form submission.

13. The method of claim 9, wherein the electronic page provides at least one selectable element allowing a denial of the source of the submission.

14. The method of claim 13, further comprising:
in response to receiving a denial of the source of the submission, generating for display a subsequent page and sending the subsequent page to the source.

15. The method of claim 9, further comprising:
causing a re-authentication request to be sent to the source when the session identifier is no longer active.

16. A system comprising:
at least one computing device; and
at least one memory device including instructions that cause the at least one computing device to:
  receive a form submission corresponding to a source, the form submission including a session identifier previously received by the source upon an authentication of the source;
  receive a secure token associated with the source, the secure token including a secure state identifier;
  cause the form submission to be processed when the session identifier corresponds to the secure state identifier and an active state for the source; and
  enable source validation based at least in part an electronic page provided to the source when the session identifier does not match the secure state identifier, the electronic page configured to enable user input.

17. The system of claim 16, wherein the electronic page includes the active state for the source and information from the form submission.

18. The system of claim 17, wherein the electronic page further includes at least one selectable element allowing for confirmation of the source of the form submission through generation of a confirmation submission, wherein the memory further includes instructions that, when executed by the processor, cause the processor to:
  generate for display a subsequent electronic page and sending the subsequent electronic page and a separate secure token to the source when the confirmation submission is received confirming the source of the form submission and the form submission does not include active state information that matches the secure state identifier.

19. The system of claim 16, wherein source validation is enabled when a user at the source confirms the source of the form submission.

20. The system of claim 16, wherein the memory further includes instructions that, when executed by the processor, cause the processor to:
  for interstitial submissions that do not include state information that matches the secure state identifier, send a subsequent electronic page to the source.

21. The system of claim 16, wherein the memory further includes instructions that, when executed by the processor, cause the processor to:
  send any communication including the session identifier using a secure communications protocol.

22. A non-transitory computer-readable storage medium having stored thereon instructions that, when executed by a computer system, cause the computer system to at least:
  receive a form submission corresponding to a source, the form submission including a session identifier previously received by the source upon an authentication of the source;
  receive a secure token associated with the source, the secure token including a secure state identifier;
  cause the form submission to be processed when the session identifier corresponds to the secure state identifier and an active state for the source; and
  enable source validation based at least in part on an electronic page provided to the source when the session identifier does not match the secure state identifier or when the form submission does not include the session identifier.

23. The non-transitory computer-readable storage medium of claim 22, wherein the instructions, when executed by the computer system, enable the computer system to:
  generate the electronic page such that the electronic page includes a set of information that allows a user at the source to confirm that the user had submitted the form submission; and
  cause the submission request to be processed when the user at the source confirms that the user has submitted the submission request.

24. The non-transitory computer-readable storage medium of claim 22, wherein the instructions, when executed by the computer system, enable the computer system to:
  receive an interstitial submission;
  generate a subsequent electronic page when the received interstitial submission does not include an active state identifier that matches the secure state identifier; and
  send the subsequent electronic page and another secure token to the source for further confirmation.

25. The non-transitory computer-readable storage medium of claim 22, wherein the electronic page includes the active state for the source, information from the form submission, and at least one selectable element allowing for confirmation of the source of the form submission through generation of a confirmation submission.

* * * * *